United States Patent
Au

(10) Patent No.: US 12,556,460 B2
(45) Date of Patent: Feb. 17, 2026

(54) METHOD AND SYSTEM FOR AUTOMATICALLY REQUESTING NETWORK MANAGEMENT DATA

(71) Applicant: MITAC COMPUTING TECHNOLOGY CORPORATION, Taoyuan (TW)

(72) Inventor: Yuen-Ching Janny Au, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 85 days.

(21) Appl. No.: 18/425,051

(22) Filed: Jan. 29, 2024

(65) Prior Publication Data

US 2024/0305540 A1 Sep. 12, 2024

(30) Foreign Application Priority Data

Mar. 10, 2023 (TW) .................................. 112108863

(51) Int. Cl.
  *H04L 41/34* (2022.01)
  *H04L 61/5007* (2022.01)

(52) U.S. Cl.
  CPC .......... *H04L 41/34* (2022.05); *H04L 61/5007* (2022.05)

(58) Field of Classification Search
  CPC ........................... H04L 41/34; H04L 61/5007
  See application file for complete search history.

(56) References Cited

U.S. PATENT DOCUMENTS

| | | | |
|---|---|---|---|
| 2014/0189837 A1* | 7/2014 | Maurer | H04W 12/02 726/7 |
| 2018/0069829 A1 | 3/2018 | Ramasamy et al. | |
| 2020/0044917 A1* | 2/2020 | Peng | H04L 41/0803 |
| 2021/0184936 A1* | 6/2021 | Mutnuru | H04L 45/04 |

FOREIGN PATENT DOCUMENTS

| | | |
|---|---|---|
| CN | 106357838 A | 1/2017 |
| CN | 104580475 B | 3/2018 |
| JP | 7007019 B2 * | 1/2022 |

OTHER PUBLICATIONS

Search Report appended to an Office Action, which was issued to Taiwanese counterpart application No. 112108863 by the TIPO on Oct. 18, 2023, with an English translation thereof.

* cited by examiner

*Primary Examiner* — Suraj M Joshi
(74) *Attorney, Agent, or Firm* — Michael Best & Friedrich LLP

(57) ABSTRACT

A method for automatically requesting network management data is implemented using a system including a network management server and a client device connected to the network management server. The method includes: after being powered on, by the client device automatically generating and transmitting a request packet to the network management server, the request packet including both a first parameter field and a request for an IP address, the first parameter field being for requesting parts of network management data; in response to receipt of the request packet, by the network management server, generating and transmitting a replying packet to the client device, the replying packet including a second parameter field, the content of the second parameter field containing the parts of the network management data, wherein the second parameter field indicates a latest version number of firmware for the client device.

20 Claims, 2 Drawing Sheets

METHOD AND SYSTEM FOR AUTOMATICALLY REQUESTING NETWORK MANAGEMENT DATA

CROSS-REFERENCE TO RELATED APPLICATION

This application claims priority to Taiwanese Invention Patent Application No. 112108863, filed on Mar. 10, 2023, the entire disclosure of which is incorporated by reference herein.

FIELD

The disclosure relates to a method and a system for automatically requesting network management data.

BACKGROUND

In the field of Internet Protocol (IP) networks, the Dynamic Host Configuration Protocol (DHCP) is a network management protocol that enables a network management server to automatically assigning IP addresses and other parameters to a number of client devices. In the IP networks, each one of the client devices connected to the network is assigned with a unique IP address. Using the DHCP, the network management server is enabled to manage and assign IP addresses. For example, when one specific client device is reconnected to the network, another IP address may be automatically assigned to the specific client device by the network management server.

It is noted that in the cases of a local area network (LAN) environment (such as a data center), a large number of client devices may be present and connected to the LAN. Each of the client devices includes a baseboard management controller (BMC) that is installed with firmware. The firmware typically needs frequent updating for safety or other reasons, and every time an update is needed, each of the client devices needs to be properly updated. Currently, the update of firmware for the client devices connected to the LAN may be done manually, including first determining whether a newer version of firmware exists, and when the determination is affirmative, manually updating the firmware for the client devices. In this manner, the process for updating the firmware may be time consuming. Additionally, some of the client devices may be left off without being updated.

SUMMARY

It may be desirable to, in the point of view of each of the client devices connected to a LAN environment, be able to obtain network management data for determining whether the client device is at a booting stage.

Therefore, an object of the disclosure is to provide a method for automatically requesting network management data. According to one embodiment of the disclosure, the method is implemented using a system including a network management server and a client device connected to the network management server. The method includes:

a) after being powered on, by the client device, automatically generating and transmitting a request packet to the network management server, the request packet including both a first parameter field and a request for an IP address, the first parameter field being for requesting parts of network management data; and b) in response to receipt of the request packet, by the network management server, generating and transmitting a replying packet to the client device, the replying packet including a second parameter field, the content of the second parameter field containing the parts of the network management data, wherein the second parameter field indicates a latest version number of firmware for the client device.

According to one embodiment of the disclosure, the method is implemented using a system including a network management server and a client device connected to the network management server. The network management server includes a database that stores a pre-stored username and a pre-stored password, the method includes:

a) after being powered on, by the client device, automatically generating and transmitting a request packet to the network management server, the request packet including both a first parameter field and a request for an IP address, the first parameter field being for requesting parts of network management data; and b) in response to receipt of the request packet, by the network management server, generating and transmitting a replying packet to the client device, the replying packet including the pre-stored username and the pre-stored password, the content of the replying packet containing the parts of the network management data.

Another object of the disclosure is to provide a system that is capable of implementing the above-mentioned method.

According to one embodiment of the disclosure, the system for automatically requesting network management data includes a network management server and a client device connected to the network management server.

The client device, after being powered on, generates and transmits a request packet to the network management server. The request packet includes a first parameter field and a request for an IP address. The first parameter field is for requesting parts of network management data.

In response to receipt of the request packet, the network management server automatically generates and transmits a replying packet to the client device. The replying packet includes both a second parameter field, the content of the second parameter field contains the parts of the network management data, and the second parameter field indicates a latest version number of firmware for the client device.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
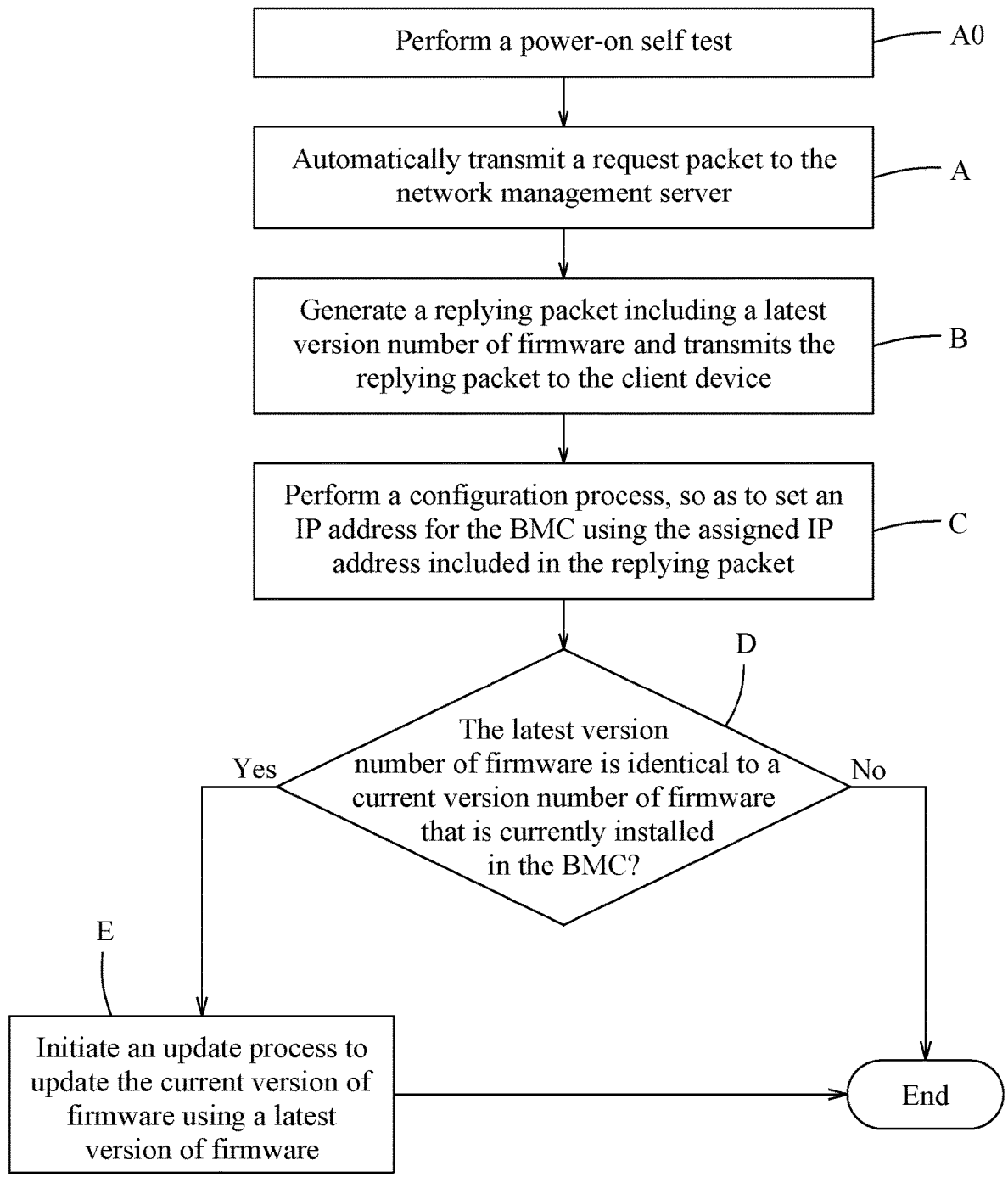
FIG. 1 is a flow chart illustrating steps of a method for automatically requesting network management data according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIG. 1 is a flow chart illustrating steps of a method for automatically requesting network management data according to one embodiment of the disclosure. In the embodiment of FIG. 1, the method is implemented using a server system that includes a network management server 1 and a plurality of client devices 2 that are connected to the network management server 1.

Figure 2:
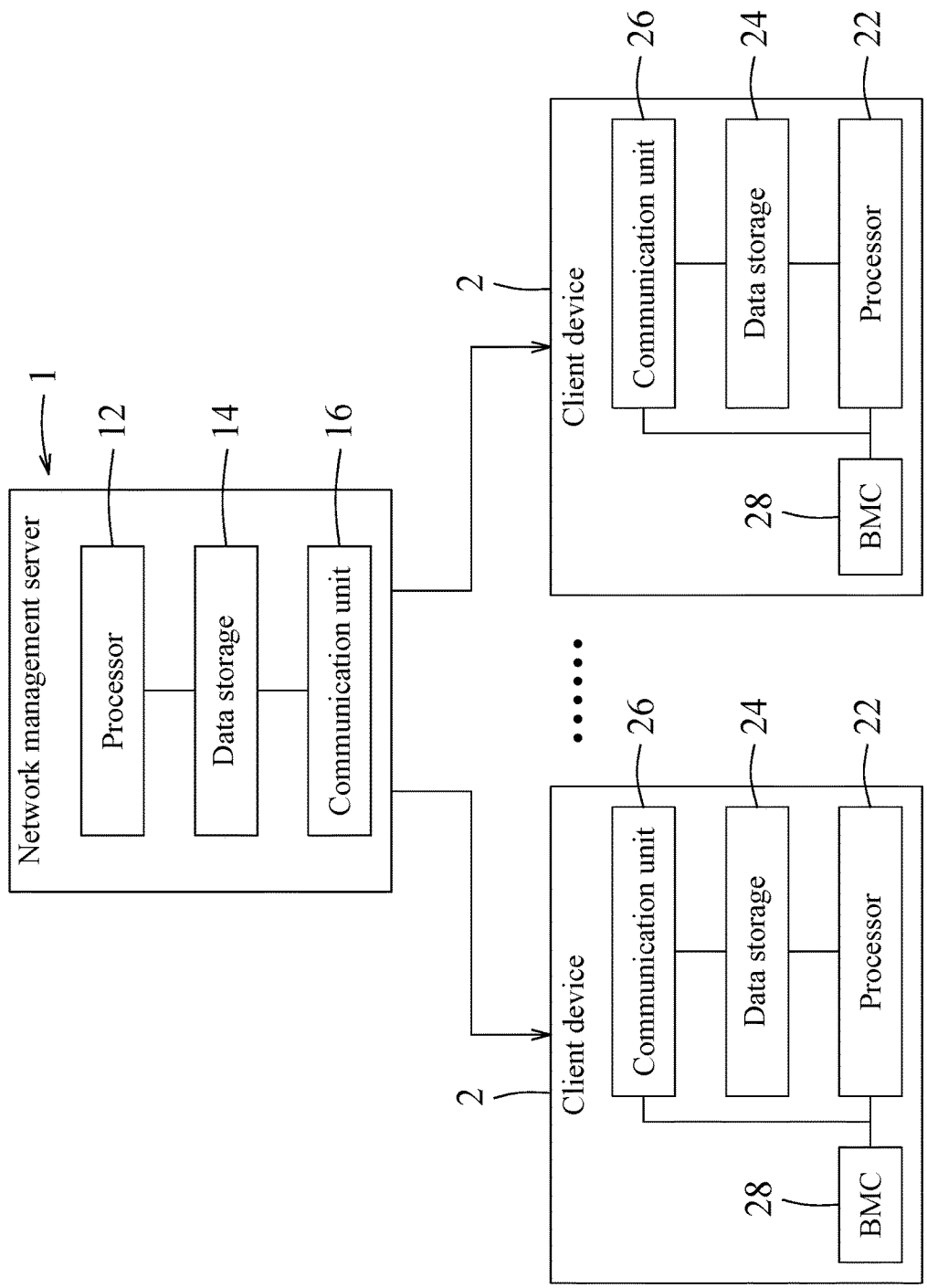
FIG. 2 is a block diagram illustrating an exemplary system for implementing the method of FIG. 1.

FIG. 2 is a block diagram illustrating an exemplary system for implementing the method of FIG. 1. The network management server 1 includes a processor 12, a data storage 14, and a communication unit 16.

The processor 12 may include, but is not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The memory module 14 is connected to the processor 12, and may be embodied using, for example, random access memory (RAM), read only memory (ROM), programmable ROM (PROM), firmware, and/or flash memory, etc. The memory module 14 stores a management software application including instructions that, when executed by the processor 12, causes the processor 12 to perform operations as described below. Additionally, in this embodiment, the memory module 14 stores a database therein, the database includes a latest version number of firmware for each of various models of the client devices 2, and a plurality of available Internet Protocol (IP) addresses. It is noted that the available IP addresses will change whenever one IP address becomes available or whenever one of the available IP addresses is used. In some embodiments, the database may further include at least one set of a pre-stored username and a pre-stored password. Each set of the pre-stored username and the pre-stored password may be associated with one or more of the client devices 2. That is to say, for example, in order to access the client devices 2, a log-in operation, in which a user inputs a set of a username and a password, may be required. In use, plural sets of usernames and passwords may be used to obtain access for a specific client device, each set granting a specific set of access permissions. It is noted that the sets of usernames and passwords associated with the client devices 2 are managed by the network management server 1, and may need to be updated (e.g., adding another set, or updating an existing set, etc.) from time to time.

The communication unit 16 is connected to the processor 12, and may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or the fifth generation (5G) of wireless mobile telecommunications technology, or the like.

Each of the client devices 2 may be embodied using a server, a computer device, etc., and includes a processor 22, a data storage 24, a communication unit 26, and a baseboard management controller (BMC) 28.

For each of the client devices 2, the processor 22, the data storage 24 and the communication unit 26 may be embodied using components similar to the processor 12, the data storage 14, and the communication unit 16, respectively. In some embodiments, the BMC 28 is connected to the communication unit 26, so as to be able to communicate with the network management server 1. The data storage 24 and/or the BMC 28 stores a client software application therein. The data storage 24 and/or the BMC 28 is also installed with firmware for executing basic functions associated with the client device 2.

The network management server 1 and the client devices 2 may be connected to a local area network (LAN), and may be implemented in a data center. It is noted that the firmware installed in the data storage 24 and/or the BMC 28 typically needs to be updated to ensure that each of the client devices 2 functions normally.

In use, when one of the client devices 2 connected to the network management server 1 is powered on, the method of FIG. 2 is implemented. It is noted that the method may be applicable to any one of the client devices 2, and in the following paragraphs, the operations are described with respect to one client device 2 for the sake of simplicity. Specifically, the processor 12 of the network management server 1 is configured to execute the management software application, and the BMC 28 of the client device 2 is configured to execute the client software application to cooperatively perform the operations as described below.

In step a0), the client device 2 is powered on. This may be done by a user pressing a power button (not depicted in the drawings) of the client device 2. In response, the client device 2 is configured to perform a power-on self test (POST). The POST may be performed by firmware or software instruction pre-stored in the data storage 24, and since the mechanism of POST, e.g., initialization, hardware testing, etc., is readily known in the related art, details thereof are omitted herein for the sake of brevity.

In step a), after the POST, the BMC 28 of the client device 2 automatically generates and transmits a request packet to the network management server 1. Specifically, the request packet includes a first parameter field and a request for an IP address therein.

In this embodiment, the request packet is transmitted using a dynamic host configuration protocol (DHCP). The first parameter field is used to store an option parameter of DHCP. Specifically, in this embodiment, the first parameter field is DHCP option 60, with the name "Class Id" and with a definition of setting a "Vendor Class Identifier" option for DHCP by default, and may be in the form of an octet string. The request packet may be in the form of a DHCP version 4 (DHCPv4) packet or a DHCP version 6 (DHCPv6) packet, but is not limited to such.

In response to receipt of the request packet, in step b), the network management server 1 generates a replying packet based on the database and the request packet, and transmits the replying packet to the BMC 28 of the client device 2.

Specifically, the replying packet includes a second parameter field and an assigned IP address. The second parameter field indicates a latest version number of firmware for the client device 2. The assigned IP address is selected from among the available IP addresses included in the database.

In embodiments, the second parameter field is used to store an option parameter of DHCP. Specifically, in this embodiment, the second parameter field is DHCP option 43, with the name "Vendor Specific" and with a definition of setting a "Vendor Specific Information" option for DHCP by default, and may be in the form of an octet string. That is to say, in step a), the BMC 28 of the client device 2 effectively transmits, in addition to the request for the IP address, model information of the client device 2, which is indicated in the first parameter field, to the network management server 1, and in turn, the network management server 1 returns, in addition to the assigned IP address, the latest version number of firmware for the client device 2 with the specific model. The replying packet may be in the form of a DHCP version 4 (DHCPv4) packet or a DHCP version 6 (DHCPv6) packet, but is not limited to such. The content of the replying packet, which may be information that is related to monitoring and management of the client device 2 and which may be obtained from the network management server 1 and/or through other remote servers, may be referred to as "network management data", and the content of the second parameter field may be referred to as parts of the network management data.

In the embodiments, the content of the first parameter field (i.e., the model information) is included in the request packet for requesting parts of the network management data (i.e., the corresponding latest version number).

It is noted that in some embodiments, the replying packet generated by the network management server 1 may further include a set of the pre-stored username and the pre-stored password, such as an auto-configuration server (ACS) username and an ACS password. In some embodiments, additional ACS parameters and/or other parameters for configuring the BMC 28 may be incorporated into the replying packet and transmitted to the BMC 28 of the client device 2.

In response to receipt of the replying packet, in step c), the BMC 28 of the client device 2 performs a configuration process, so as to set an IP address for the BMC 28 using the assigned IP address included in the replying packet. In the embodiments that the replying packet includes the set of the pre-stored username and the pre-stored password, the BMC 28 may further update a username and a password stored in the data storage 24 when it is determined that the pre-stored username and the pre-stored password are different from the username and the password stored in the data storage 24, respectively. In the embodiments that additional ACS parameters and/or other parameters are incorporated into the replying packet, the BMC 28 may further update current parameters using the ACS parameters and/or the other parameters for configuring the BMC 28.

Additionally, in step d), the BMC 28 of the client device 2 determines whether the latest version number of firmware received in the replying packet is identical to a current version number indicating a current version of firmware that is currently installed in the BMC 28. When is it determined that the latest version number is identical to the current version number, it may be determined that the current version of firmware is the latest version, and no update is needed. As such, the method is terminated. Otherwise, in the case that the latest version number is not identical to the current version number, the flow proceeds to step e).

In step e), the BMC 28 of the client device 2 initiates an update process, in which the BMC 28 controls the communication unit 26 to establish a connection with an external source (e.g., an external server that contains a latest version of firmware), to download the latest version of firmware from the external source, and to update the current version of firmware using the latest version of firmware. As such, the method is completed.

To sum up, a method and a system for requesting network management data are proposed in accordance with some embodiments of this disclosure. In the method, when one of a plurality of client devices 2 is powered on, after performing the POST, the BMC 28 of the client device 2 is configured to automatically generate and transmit a request packet that includes, in addition to a request for an IP address, a first parameter field containing model information of the client device 2. In response to receipt of the request packet, the network management server 1 generates and transmits a replying packet that includes, in addition to an assigned IP address, a second parameter field that indicates a latest version number of firmware associated with the model information to the client device 2. The client device 2 is then able to determine whether the currently installed firmware is up-to-date, and in the case that the currently installed firmware is not the latest version, the client device 2 may automatically connect to an external source to download the latest version of firmware. As such, after the client devices 2 connected to the network management server 1 are powered on, each of the client devices 2 is configured to communicate with the network management server 1 to automatically check whether the firmware installed is up-to-date. It is also noted that, in embodiments, the first parameter field is embodied using the DHCP option 60, and the second parameter field is embodied using the DHCP option 43, where both fields are not in use during the conventional operations of firmware versions management. As such, by adopting the method and the system for requesting network management data in accordance with some embodiments of this disclosure, the operations of requesting an IP address and checking the version of the firmware may be done simultaneously after the client device 2 is powered on.

Additionally, in conventional practice, the operation of checking the firmware version is performed after the assignment of IP address, and is performed by each of the client devices 2 executing a software application written in the Python language. In contrast, since the method of this disclosure is implemented after each of the client devices 2 is powered on and since the operations of checking the firmware versions and requesting IP addresses are performed simultaneously, the potential scenario where some of the client devices 2 in a large data center are left without firmware updates due to the need to manually update each client device may be eliminated.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for automatically requesting network management data, the method being implemented using a system including a network management server and a client device connected to the network management server, the method comprising:
   a) after being powered on, by the client device, automatically generating and transmitting a request packet to the network management server, wherein the request packet includes both a first parameter field and a request for an IP address, and the first parameter field is for requesting parts of network management data; and
   b) in response to receipt of the request packet, by the network management server, generating and transmitting a replying packet to the client device, the replying packet including a second parameter field, the content of the second parameter field containing the parts of the network management data, wherein the second parameter field indicates a latest version number of firmware for the client device.

2. The method as claimed in claim 1, the network management server including a database that stores a plurality of available Internet Protocol (IP) addresses, wherein:
   in step b), the network management server generates the replying packet to further include an assigned IP address which is one of the available IP addresses.

3. The method as claimed in claim 2, further comprising, after step b):
   c) in response to receipt of the replying packet, by the client device, performing a configuration process, so as to set an IP address for the client device using the assigned IP address included in the replying packet.

4. The method as claimed in claim 1, wherein:
   in step a), the first parameter field includes model information associated with the client device;
   in step b), the latest version number of firmware indicated by the second parameter field corresponds to the model information;
   the method further comprising, after step b):
   d) in response to receipt of the replying packet, by the client device, determining whether the latest version number of firmware received in the replying packet is identical to a current version number indicating a current version of firmware that is currently installed in the client device.

5. The method as claimed in claim 4, further comprising:
   e) by the client device, in the case that it is determined that the latest version number is not identical to the current version number, initiating an update process, in which the client device establishes a connection with an external source, downloads the latest version of firmware from the external source, and updates the current version of firmware using the latest version of firmware.

6. The method as claimed in claim 1, wherein in step a), the request packet is transmitted using a dynamic host configuration protocol (DHCP), and in step b), the replying packet is transmitted using DHCP.

7. The method as claimed in claim 6, wherein:
   the first parameter field is DHCP option 60; and
   the second parameter field is DHCP option 43.

8. The method as claimed in claim 1, the network management server including a database that stores a pre-stored username and a pre-stored password, wherein in step b), the network management server generates the replying packet to further include the pre-stored username and the pre-stored password.

9. The method as claimed in claim 1, wherein step a) further includes performing a power-on self test (POST) before generating and transmitting the request packet.

10. A method for automatically requesting network management data, the method being implemented using a system including a network management server and a client device connected to the network management server, the network management server including a database that stores a pre-stored username and a pre-stored password, the method comprising:
    a) after being powered on, by the client device, automatically generating and transmitting a request packet to the network management server, wherein the request packet includes both a first parameter field and a request for an IP address, and the first parameter field is for requesting parts of network management data; and
    b) in response to receipt of the request packet, by the network management server, generating and transmitting a replying packet to the client device, the replying packet including the pre-stored username and the pre-stored password, the content of the replying packet containing the parts of the network management data.

11. A system for automatically requesting network management data, comprising a network management server and a client device connected to the network management server, wherein:
    the client device, after being powered on, automatically generates and transmits a request packet to the network management server, the request packet includes both a first parameter field and a request for an IP address, the first parameter field is for requesting parts of network management data; and
    in response to receipt of the request packet, the network management server generates and transmits a replying packet to the client device, the replying packet includes a second parameter field, the content of the second parameter field contains the parts of the network management data, and the second parameter field indicates a latest version number of firmware for the client device.

12. The system as claimed in claim 11, wherein, the network management server includes a database that stores a plurality of available Internet Protocol (IP) addresses, and the network management server generates the further included assigned IP address which is one of the available IP addresses.

13. The system as claimed in claim 12, wherein:
    in response to receipt of the replying packet, the client device further performs a configuration process, so as to set an IP address for the client device using the assigned IP address included in the replying packet.

14. The system as claimed in claim 11, wherein:
    the first parameter field of the request packet generated by the client device includes model information associated with the client device; and the network management server generates the replying packet in a manner that the latest version number of firmware indicated by the second parameter field corresponds to the model information.

15. The system as claimed in claim 14, wherein, in response to receipt of the replying packet, the client device further determines whether the latest version number of firmware received in the replying packet is identical to a current version number indicating a current version of firmware that is currently installed in the client device.

16. The system as claimed in claim 15, wherein:
in the case that it is determined that the latest version number is not identical to the current version number, the client device initiates an update process, in which the client device establishes a connection with an external source, downloads the latest version of firmware from the external source, and updates the current version of firmware using the latest version of firmware.

17. The system as claimed in claim 11, wherein the client device transmits the request packet using a dynamic host configuration protocol (DHCP), and the network management server transmits the replying packet using DHCP.

18. The system as claimed in claim 17, wherein:

the first parameter field is DHCP option 60; and the second parameter field is DHCP option 43.

19. The system as claimed in claim 11, wherein the network management server includes a database that stores a pre-stored username and a pre-stored password, and generates the replying packet to further include the pre-stored username and the pre-stored password.

20. The system as claimed in claim 11, wherein the client device performs a power-on self test (POST) before generating and transmitting the request packet.

\* \* \* \* \*